United States Patent
El-Mankabady et al.

(10) Patent No.: US 10,249,174 B2
(45) Date of Patent: Apr. 2, 2019

(54) WIRELESS EMERGENCY ALERT NOTIFICATIONS

(71) Applicant: Siemens Industry, Inc., Alpharetta, GA (US)

(72) Inventors: Emad El-Mankabady, Monroe, NJ (US); Daniel S. Iasso, Towaco, NJ (US); Robert Limlaw, Boonton, NJ (US); Lester K. Perlak, Westfield, NJ (US); George E. Baker, Cedar Grove, NJ (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 36 days.

(21) Appl. No.: 14/815,410

(22) Filed: Jul. 31, 2015

(65) Prior Publication Data
US 2017/0032660 A1   Feb. 2, 2017

(51) Int. Cl.
| | | |
|---|---|---|
| G08B 1/08 | (2006.01) | |
| G08B 25/10 | (2006.01) | |
| G08B 17/00 | (2006.01) | |
| G10L 13/00 | (2006.01) | |
| G06F 17/28 | (2006.01) | |
| G08B 25/00 | (2006.01) | |
| G08B 25/14 | (2006.01) | |

(52) U.S. Cl.
CPC .............. *G08B 25/10* (2013.01); *G06F 17/28* (2013.01); *G08B 17/00* (2013.01); *G08B 25/009* (2013.01); *G08B 25/14* (2013.01); *G10L 13/00* (2013.01)

(58) Field of Classification Search
CPC .......... G08B 25/10; G08B 17/00; G06F 17/28; G10L 13/00
USPC ........................................ 340/539.1
See application file for complete search history.

(56) References Cited

U.S. PATENT DOCUMENTS

| | | | |
|---|---|---|---|
| 2003/0067386 A1 | 4/2003 | Skinner | |
| 2010/0070282 A1* | 3/2010 | Cho | G06Q 30/0603 704/260 |
| 2011/0279263 A1 | 11/2011 | Rodkey et al. | |
| 2013/0154822 A1 | 6/2013 | Kumar et al. | |
| 2014/0047080 A1 | 2/2014 | Piccolo, III et al. | |
| 2014/0070939 A1 | 3/2014 | Halverson et al. | |
| 2014/0219435 A1* | 8/2014 | Chaturvedi | H04M 3/562 379/202.01 |
| 2014/0287711 A1* | 9/2014 | Williams | H04M 1/72538 455/404.1 |
| 2014/0378082 A1* | 12/2014 | Ros | H04W 4/22 455/404.1 |
| 2015/0109112 A1 | 4/2015 | Fadell et al. | |
| 2015/0235540 A1* | 8/2015 | Verna | H04W 4/12 340/539.11 |
| 2015/0256277 A1* | 9/2015 | Johnson | H04L 51/14 340/601 |
| 2015/0281928 A1* | 10/2015 | Auen | H04W 4/22 455/404.2 |

OTHER PUBLICATIONS

PCT Search Report dated Oct. 5, 2016, for PCT Application No. PCT/US2016/042018, 18 pages.

* cited by examiner

*Primary Examiner* — Dhaval V Patel

(57) ABSTRACT

An approach is described for sending alert messages and notifications to individual devices and in a format understandable by a user of the communication device.

19 Claims, 8 Drawing Sheets

WIRELESS EMERGENCY ALERT NOTIFICATIONS

FIELD OF THE INVENTION

This application relates to the field of emergency notification from alarm systems and more particularly to notification alerts to communication devices triggered by a fire alarm system.

BACKGROUND

In alarm systems, such as building fire alarm systems, it is desirable to have alert capabilities such as audio and visual alert capabilities. Audio capabilities enable emergency communication to be passed between fire control panels and/or audio panels in an alarm system. As audio capabilities have been integrated with building fire alarm systems such as mass notification systems, the need has emerged for alerts to be tailored or directed to individuals. At times, individuals with unique requirements may be present in a building or on a campus. Such individuals may have a disability or problems understanding the language or words in a typical alert message that is broadcast in a building via fire control panels and/or audio panels.

What is needed in the art is an approach for generating and sending directed messages to individuals that may be tailored to the individual's needs or limitations.

SUMMARY

In accordance with one embodiment of the disclosure, a safety alarm system is described. The safety alarm system may have a controller coupled to a memory where the memory has a plurality of messages that are each associated with a mass notification event. When a mass notification event occurs, the safety alarm system may trigger a message to be sent to smart devices and/or computers. The message may be modified for some of the recipients with conversions of audio messages to one or more languages and/or to text in one or more languages via further conversion.

It is also possible that a safety alarm system is damaged during an emergency and is unable to send audio messages via the buildings fire panels and speakers. In such instances, it is advantageous to have a second communication approach or path to send alert messages to building or campus occupants.

The above described features and advantages, as well as others, will become more readily apparent to those of ordinary skill in the art by reference to the following detailed description and accompanying drawings. While it is desirable to provide notification (sometime referred to as alerts) to user communication devices, the teachings disclosed herein also extend to those embodiments which fall within the scope of the appended claims, regardless of whether they accomplish one or more of the above-mentioned advantages.

DESCRIPTION

An example emergency alert notification approach for handling fire alarm and notification events is presented.

Figure 1:
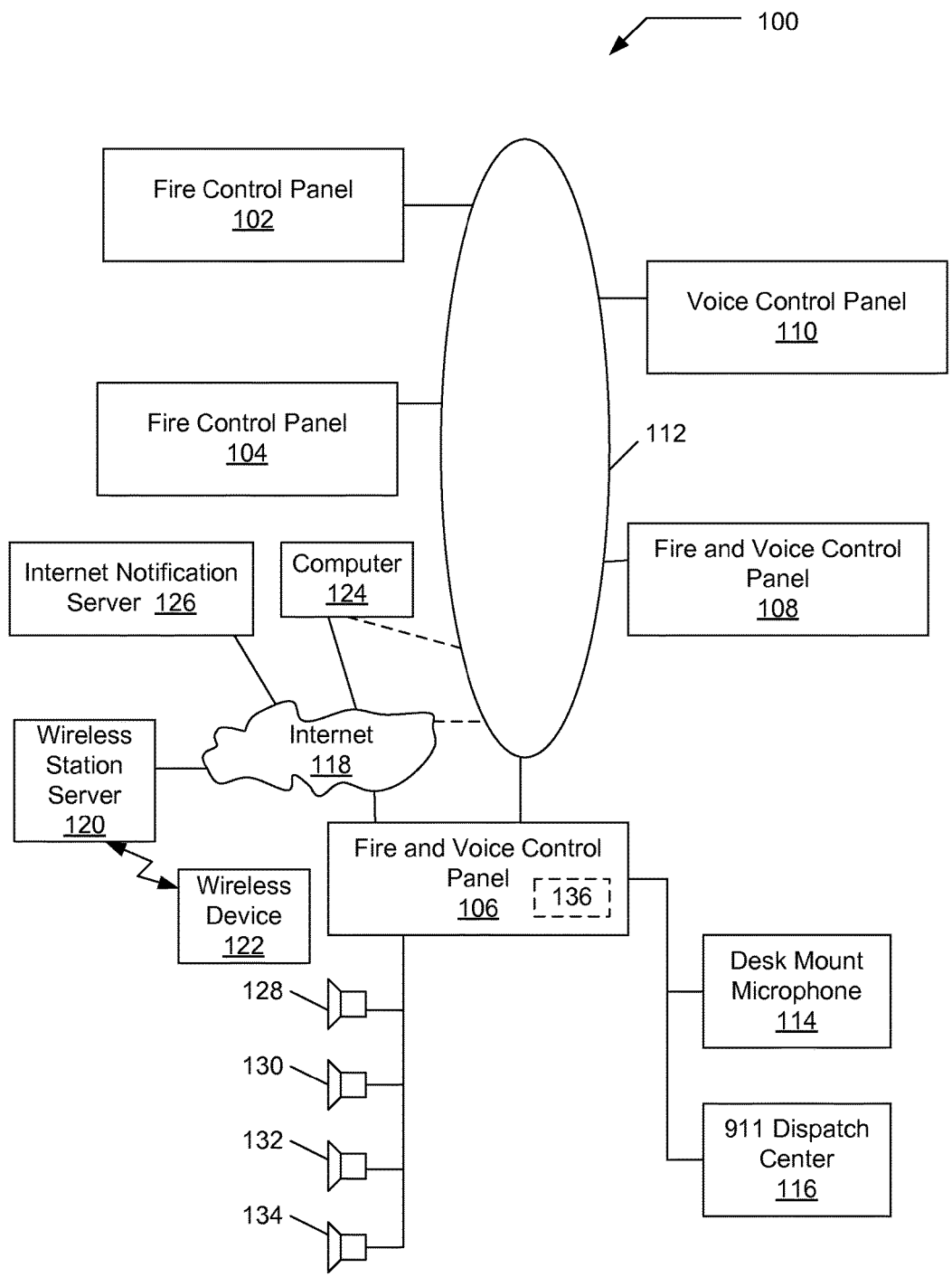
FIG. 1 is an exemplary topology diagram for a building fire alarm system.

With reference to FIG. 1, an exemplary topology diagram 100 for a building fire and audio alarm system (safety alarm system) approach is shown. The building fire and audio alarm system may have numerous fire control panels, such as fire control panels 102 and 104, fire and voice control panels 106 and 108, and voice control panels 110. In other implementations there may be more or fewer devices in the building fire and audio alarm system. In yet other implementations, additional panels such as security panels or HVAC control panels may be present. The panels 102-110 may be networked together by a data network 112. The data network may have a physical layer of wire, radio waves, fiber optic cables, coaxial cable, or a combination of any of the above. Over the physical layer, additional protocol layers may be implemented to carry data, such as a TCP/IP network (commonly called the internet). The data network 112 may be configured as a local area network (LAN) that connects the panels and building automation systems.

The fire and voice control panel, such as fire and voice control panel 106, may have associated desk mounted microphones 114 and/or connection to an emergency center, such as a 911 dispatch center 116. Additionally, the fire and voice control panel 106 may have audio outputs for connection to speakers, such as speaker 128-134 and/or amplifiers (not shown). In other implementations, the desk microphone 114 may be an internal microphone or other audio input device.

The fire control panel 106 may also be coupled via the internet 118 to a notification server, such as internet notification server 126 and a wireless station server 120 that enable communication with wired or wireless communication devices. The internet notification server 126 may resides in the cloud (distributed network) coupled to the internet 118 or be located locally. An example of a wireless station server 120 is a server that resides in a cellular communication network and is able to communicate with wireless devices (for example wireless device 122) such as tables, smartphones, or similar devices. Communication may also be achieved over wired network with wired devices such as computer 124. Computer 124 is shown as connected to the internet 118, but in other implementations it may be coupled indirectly to the internet via other networks (see dotted lines in FIG. 1). Examples of messaging (wired or wireless) may include instant messaging text messaging, electronic mail (email), and/or smart devices notification message (text or digitized messaging such as digitized audio).

Figure 2:
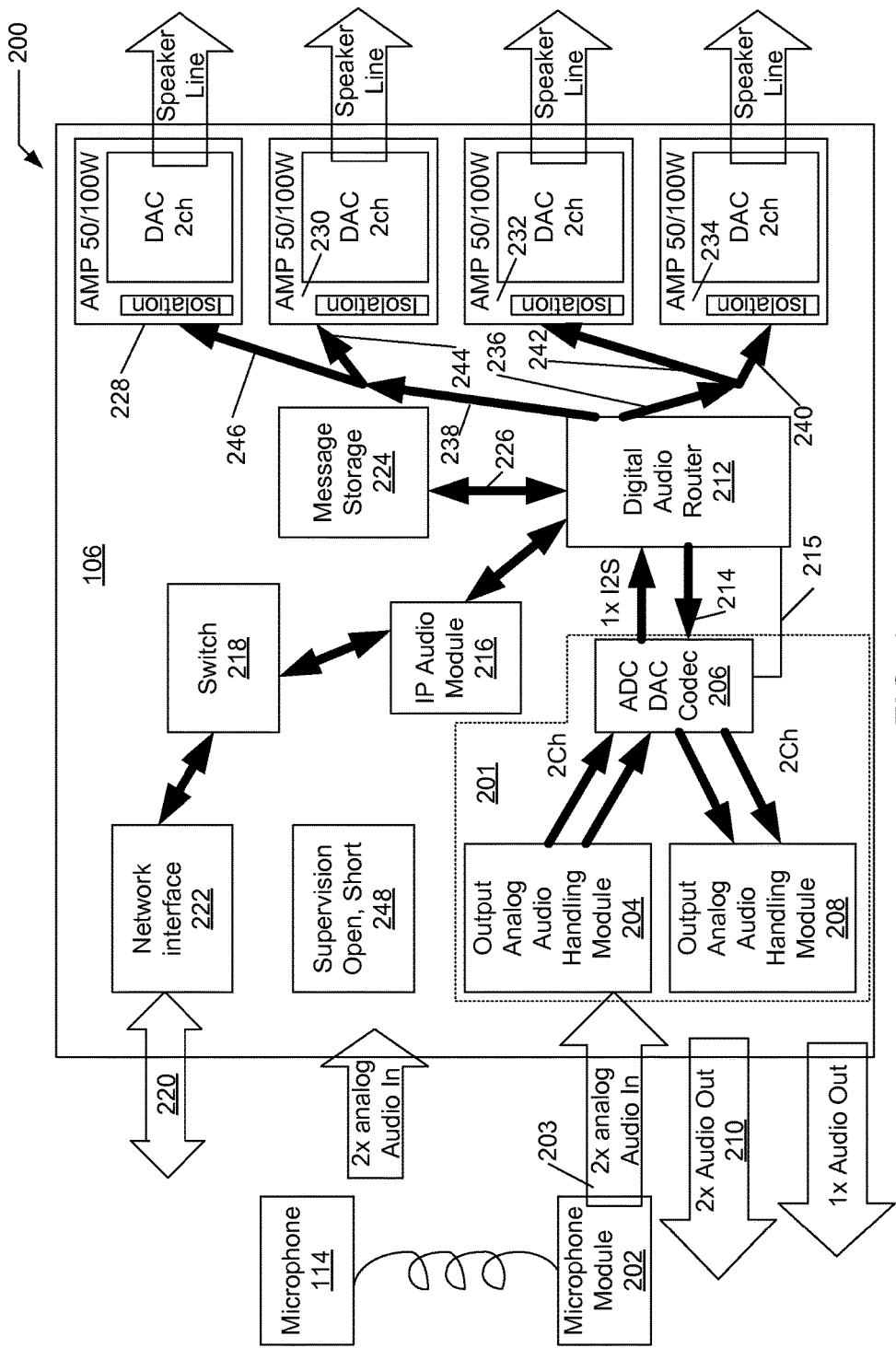
FIG. 2 is a block diagram of the fire and voice control panel of FIG. 1 is depicted in accordance with an example implementation of the invention.

Turning to FIG. 2, a block diagram 200 of the fire and voice control panel 106 is depicted in accordance with an example implementation of the invention. The desk mounted microphone 114 may be connected to a microphone module 202 that supports one or more audio inputs 203 (two in the current example). The microphone module 202 is in signal communication with an input analog audio handling module 204. The input analog audio handling module 204 may provide separate channels to an ADC DAC codec 206 that is able to handle two audio channel inputs. The ADC DAC codec 206 may have a 48 kHz sampling rate with at least a 16 bit resolution. The analog to digital converter (ADC) and digital to analog converter (DAC) in the ADC DAC codec 206 may be implemented as slave devices. The analog channels may then be routed to the output analog audio handling module 208 for transmission on one of the analog outputs 210.

The ADC DAC codec 206 also communicates with Digital Audio Router 212 that may be implemented with a field-programmable gate array (FPGA) via a two-way I2S audio bus 214. An I2S audio bus (also called $I^2S$, Inter-IC Sound, Integrated Interchip Sound, or IIS) is an electrical serial bus interface that consists of three lines, 1) bit clock line, 2) word clock line, and 3) at least one multiplexed data line. It may also include a master clock and a multiplexed data line for upload. Typically the I2S bus carries PCM digital audio data or signals. The I2S allows two channels to be sent on the same data line. The two channels are commonly called right (R) channel and left (L) channel. The word clock is typically a 50% duty-cycle signal that has the same frequency as the sample frequency. The I2S audio bus is defined by the Philips Semiconductor I2S bus specification (February 1986, revised Jun. 5, 1996).

The Digital audio router 212 enables digitized audio, such as digitized analog audio from microphone 114 may be provided to an IP audio module 216. The IP audio module 216 converts the digitized audio into voice over IP (VOIP) encoded data. An example of the IP audio module 216 is IP Audio Module 102 produced by BARIX. The output of the IP audio module 216 is VOIP encoded data. The VOIP encoded data is made available to a switch 218 that enables the VOIP encoded data to be transported by an IP network (Ethernet 220) by network interface 222. Network interface 222 may also be coupled to the internet 118.

The digital audio router 212 may also be connected to memory 224 via a data bus 226, where pre-recorded digitized audio messages may be stored in memory 224. The memory may also store metrics and operational data for the Fire and Voice Control Panel's operation. The memory 224 may be implemented as electronic non-volatile computer storage device that can be electrically erased and reprogrammed, i.e. flash memory. In other implementations, other types of memory such as RAM, DRAM, SDRAM, EEPROM may be employed.

One or more amplifiers and/or speakers may be in signal communication with the digital audio router 212, such as amplifiers 228-234 via I2S buses 236 and 238 (two I2S buses are used in the current example). Each of the buses 236 and 238 each have a respective L and R channels, i.e. 240, 242 and 244, 246. The output of each of the amplifiers 228-238 may be connected to speakers 118-124 of FIG. 1 respectively. A supervisory module 236 may monitor the operation of the fire and voice control panel 106.

Figure 3:
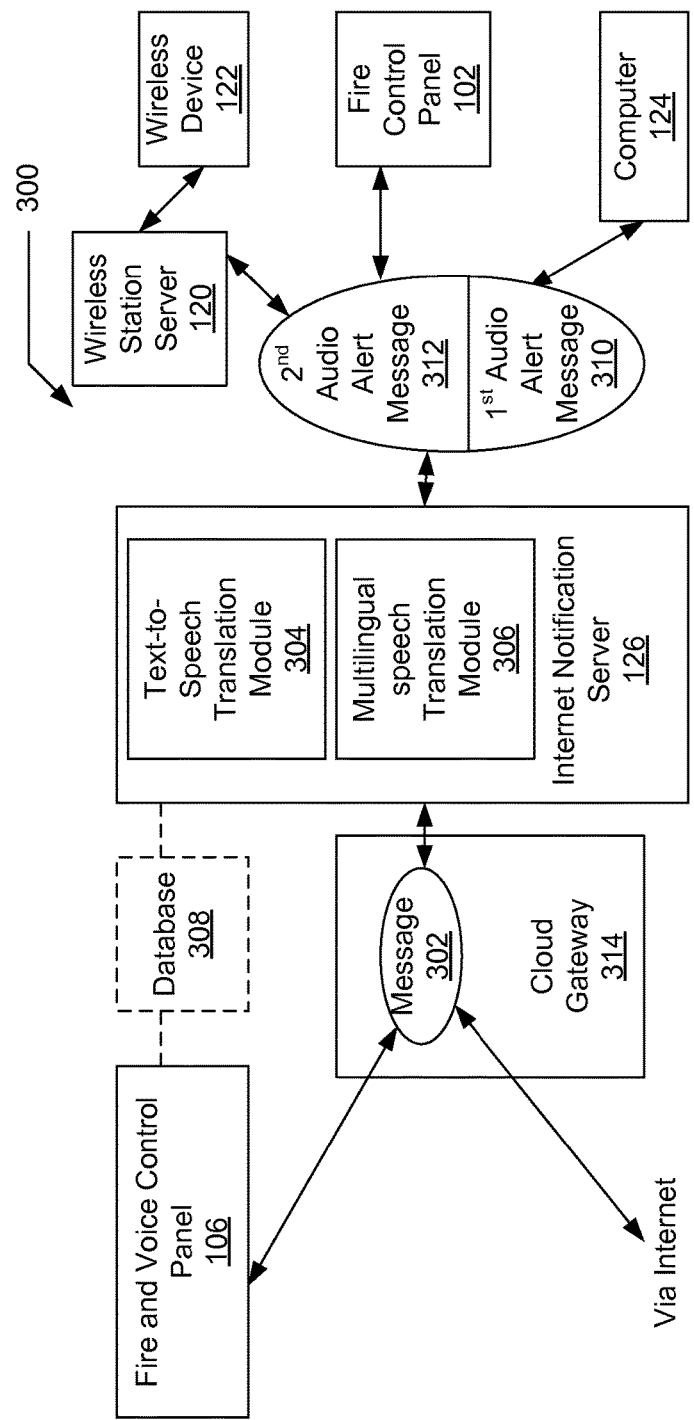
FIG. 3 is a block diagram 300 of the fire and voice control panel in communication with wireless device and computer of FIG. 1 in accordance with an example implementation of the invention.

In FIG. 3, a block diagram 300 of the fire and voice control panel 106 in communication with wireless device 122 and computer 124 of FIG. 1 is depicted in accordance with an example implementation of the invention. The fire and voice control panel 106 may push a text based message to a cloud gateway 314 that is able to send the message 302 to internet notification server 126 in the form of an email, SMS, instant message, tweet, text, or similar text message and/or to wireless station server 120. The message 302 may be converted in the cloud gateway 314 from a text message into a first audio alert message 310 (another message) having a first language (i.e. English) via the text-to-speech translation module 304 in the internet notification server 126. In other implementations, the text-to-speech translation may occur in the wireless station server 120. The message 302 may also be converted into a second audio alert message 312 having a second language (i.e. German) by the multilingual speech translation module 306 in the internet notification server 126. In other implementations the multilingual speech translations may occur in the wireless station server 120. In yet other implementations, the multilingual speech translation module 306 may convert the first audio alert message from the text-to-speech translation module 304 into the second audio alert message 312 having the second language.

Modules, such as multilingual speech translation module 306 and text-to-speech translation module 304 may be implemented in software (plurality of machine readable instructions), hardware, or a combination of software and hardware. Examples of existing text-to-speech translation software include NATURALREADER, ULTRA HAL TTS READER, and READCLIP. Examples of existing speech-to-text software include NUANCE COMMUNICATIONS' DRAGON NATURALLY SPEAKING, SPEECHGEAR INTERACT, and BRAINA.

The first audio alert message 310 and second audio alert message 312 may be sent to wireless devices 122 via wireless networks and via the internet protocol to fire control panels (such as fire control panel 102) and computers 124. These devices then may play the first or second audio message on the device. In other implementations, the audio message may be streamed audio messages. In yet other implementations, the audio messages may trigger dedicated applications running on the wireless device 122, computer 124, and/or fire control panel 102 to play the alert audio messages.

A database 308 may be associated with the wireless station server 120 that identifies the devices (such as wireless device 102, 122, and/or 124) to receive one of the audio alert messages 310 or 312. Part of that database may also identify the language of the alert message. For example, a German user's wireless communication device would be identifiable in database 308 and the wireless station server would only send the second audio alert message that has been translated into German to that wireless communication device.

The wireless station server 120 also may provide supervision between the fire and voice control panel 106 and the wireless station server 120. The supervision may be a periodic supervision message that is sent at predetermined times, such as every hour. The periodic supervision message, when received at the wireless station server 120, may result in a wireless supervision message being sent to a cellular modem 136 located or associated with the fire and voice control panel 106. Thus, sending a supervision message from the fire and voice control panel 106, internet 118, wireless station server 120, resulting in a wireless supervision message being sent to the cellular modem 136 verifies the communication path is operational.

Similarly, supervision may be accomplished between the computer 124, wireless device 122, and other fire control panels (such as 102) by periodically sending at predetermined times, supervision messages to those devices. A device receiving the supervision message responds with a supervision acknowledgement message. An application may be running on the computer 124, wireless device 122, and other fire control panels, that monitor the communication link for supervision messages. When the application receives the supervision message, a supervision acknowledgement message is generated and sent back to the fire and voice control panel 106 via network 112, internet 118, and/or cellular modem 136. The fire and voice control panel 106 may track which communication devices respond to supervision messages and generate alerts or logs of identifying what communication devices have and/or have not responded to the supervision messages.

Figure 4:
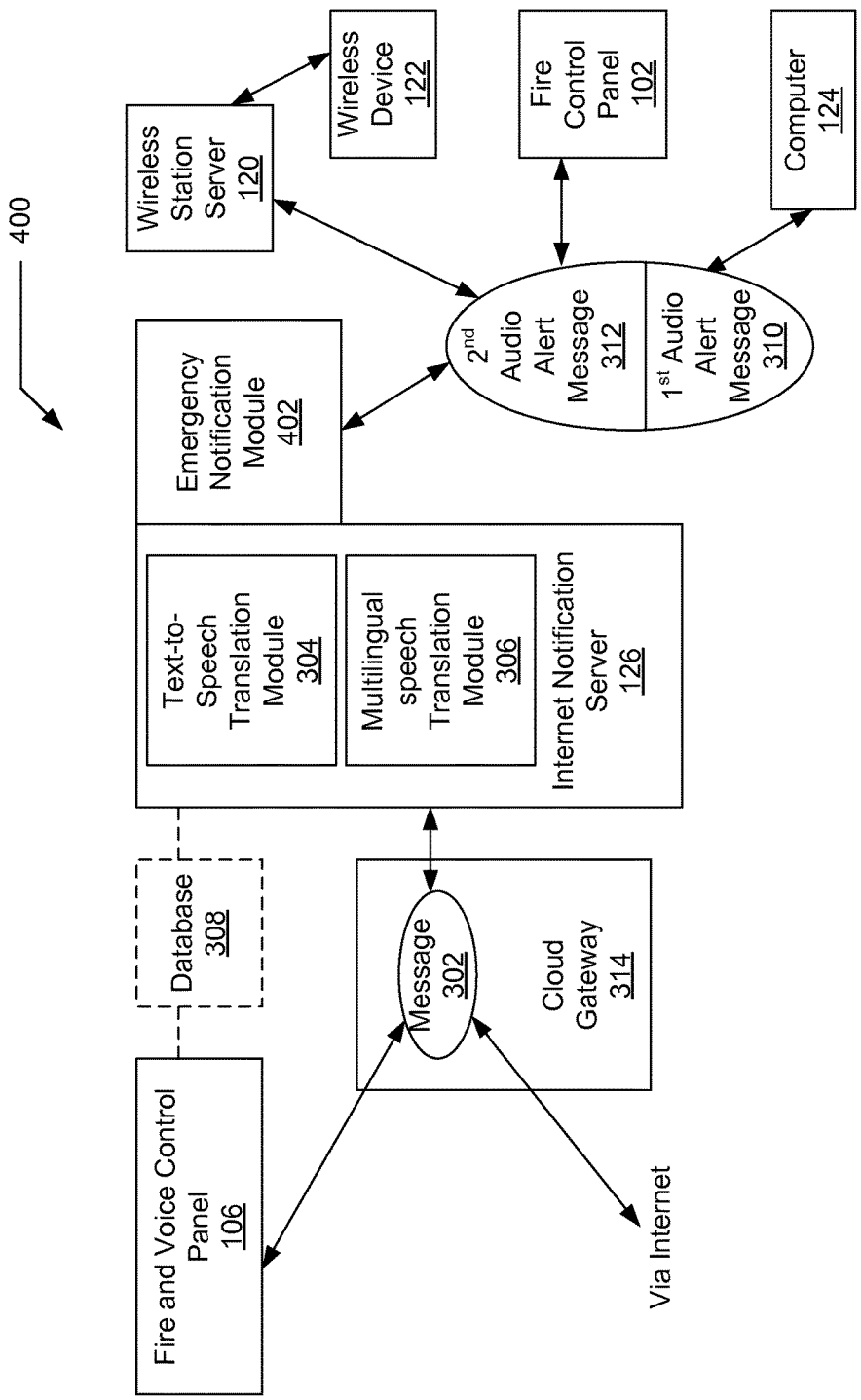
FIG. 4 is a block diagram of the fire and voice control panel of FIG. 1 sending a first audio alert message via an emergency notification module to wireless device in accordance with an example implementation of the invention.

Turning to FIG. 4, a block diagram 400 of the fire and voice control panel 106 sending a first audio alert message 310 via an emergency notification module 402 to wireless device 122 is depicted in accordance with an example implementation of the invention. An audio or text message may be send to the cloud (internet notification server 126) and then onto the wireless station server 120 from the fire and voice control panel 106. The internet notification server 126 may then translate the message if needed using modules 304 and/or 306. It is noted that the internet notification server 126 and cloud gateway 314 may be implemented as a single device or co-located device. The resulting audio alert message 310 or 312 may then be sent to wireless device 122 by wireless emergency alert (WEA). The WEA may be a vibration and/or unique audio sound. An advantage to the WEA approach is everyone in an area covered by sectors of a cellular cell or micro cell across a campus will received notification. Multiple notifications such the first audio alert message 310 and second audio alert message 312 may be sent one after the other to everyone covered by the cellular or micro cell sites.

The WEA service (formerly known as the Commercial Mobile Alert System (CMAS) or Personal Localized Alerting Network (PLAN)) is a public safety system that allows customers who own certain wireless phone models and other enabled mobile devices to receive geographically-targeted, text-like messages alerting them of imminent threats to safety in their area. The technology ensures that emergency alerts will not get stuck in highly congested areas, which can happen with standard mobile voice and texting services. WEA was established pursuant to the Warning, Alert and Response Network (WARN) Act.

WEA enables government officials to target emergency alerts to specific geographic areas (e.g. lower Manhattan) through cell towers. The cell towers broadcast the emergency alerts for reception by WEA-enabled mobile devices. WEA complements the existing Emergency Alert System (EAS) which is implemented by the FCC and FEMA at the federal level through broadcasters and other media service providers. WEA and the EAS are part of FEMA's Integrated Public Alert and Warning System (IPAWS). Wireless companies volunteer to participate in WEA, which is the result of a unique public/private partnership between the FCC, FEMA and the wireless industry to enhance public safety. Participating wireless carriers were required to deploy WEA by Apr. 7, 2012.

Pre-authorized national, state or local governments may send emergency alerts regarding public safety emergencies, such as evacuation orders or shelter in place orders due to severe weather, a terrorist threat or chemical spill, to WEA. Alerts from authenticated public safety officials are sent through FEMA's IPAWS to participating wireless carriers. Participating wireless carriers push the alerts from cell towers to mobile devices in the affected area. The alerts appear like text messages on mobile devices. Alerts are broadcast only from cell towers in the zone of an emergency. The alerts are geographically targeted to cell towers in the location of the emergency. Phones that are using the cell towers in the alert zone will receive the WEA. This means that if an alert is sent to an area in New York, all WEA-capable phones in the alert area can receive the WEA, even if they are phones that are roaming or visiting from another state. In other words, a customer visiting New York from Chicago would receive alerts in New York if they have a WEA-enabled mobile device and their phone is using a cell tower in the alert zone in New York.

Figure 5:
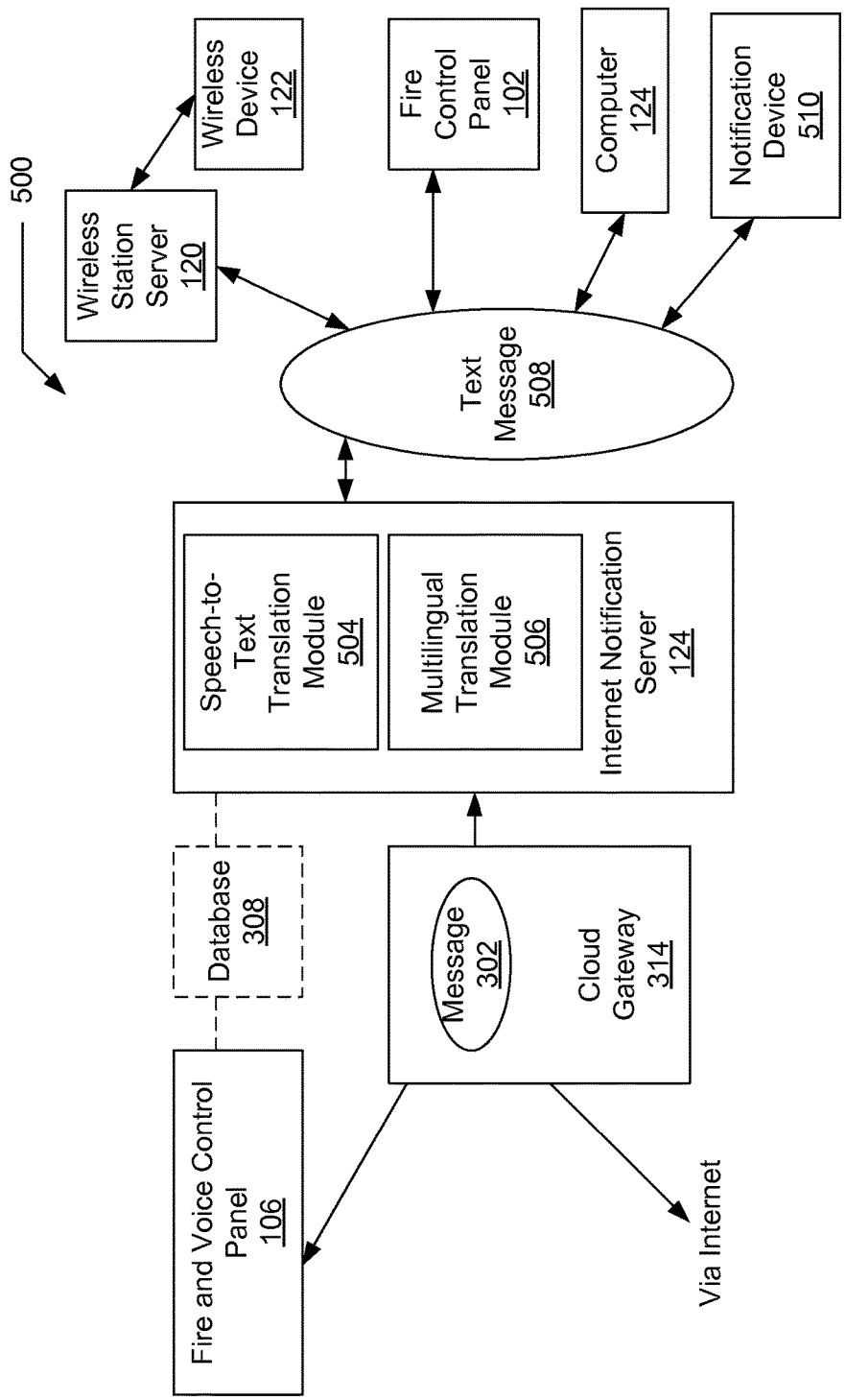
FIG. 5 is a block diagram of the fire and voice control panel sending a first audio alert message as text via the wireless station server of FIG. 1 in accordance with an example implementation of the invention.

In FIG. 5, a block diagram 500 of the fire and voice control panel 106 of FIG. 1 sending a message 302 as a text message 508 via the wireless station server 120 is depicted in accordance with an example implementation of the invention. The fire and voice control panel 106 may send a message 302 (audio message) to be played at voice and fire panels located in the building or campus. The message may also be sent via the internet or other network (i.e. phone, wireless, Packet) to a wireless station server 120. The internet notification server 126 has a speech-to-text translation module 504 that translates the audio message into a text message 508. The text message 508 (another message) may also be translated into different language (either predefined or identified from database 308) via the multilingual translation module 506. The text messages 508 may then be sent from the internet notification server 126 to wireless device 122, fire control panel 102 (if fire control panels are configured to receive text messages), computer 124, and notification devices 510. The selection of the text message (i.e. which language) may be based upon information contained in the database 308. The information in the database 308 may contain an identifier for a device (such as wireless device 122) and a language identifier. Notification devices include LED scroll messaging boards, ticker displays on monitors, and similar text displaying devices. The text message 508 may be broadcast via a cellular wireless network that is in communication with the wireless station server 120. In other implementations, the fire control panel may have the capability to send and receive text messages. This may be accomplished by incorporating a cellular modem 136 in the fire control panels, such as fire control panel 102, fire and voice control panel 108, and voice control panel 110.

It is understood that the modules 402, 504, and 506 may be implemented in hardware, software, or a combination of hardware and software. Approaches for text-to-speech and translations have been provided (NUANCE COMMUNICATIONS' DRAGON NATURALLY SPEAKING) and similarly approaches for speech translations are also readily available. The emergency notification module 402 enables direct communication with wireless station servers and may be implemented as a cellular communication device.

Figure 6:
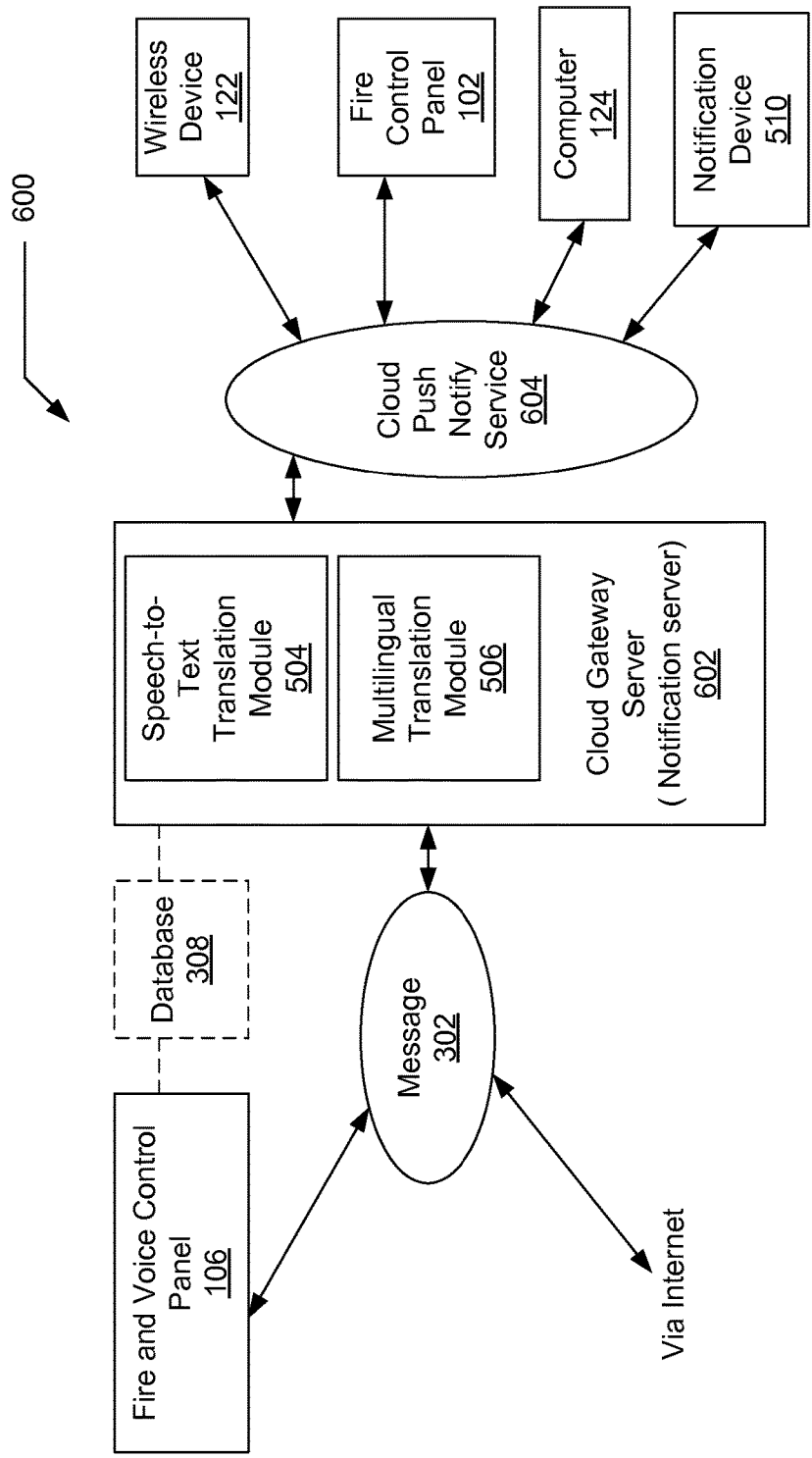
FIG. 6 is a block diagram of the fire and voice control panel of FIG. 1 sending a message to a cloud gateway server to format the message to be pushed to user communication device in accordance with an example implementation of the invention.

Turning to FIG. 6, a block diagram 600 of the fire and voice control panel 106 of FIG. 1 sending a message 302 to a cloud gateway server 602 to format the message to be pushed to user communication device is depicted in accordance with an example implementation of the invention. The fire and voice control panel 106 may send a message 302 to a cloud gateway 602. The message fire and voice control panel 106 may be coupled to the cloud gateway via a network connection using a SSH tunnel with a socket connectivity to the cloud gateway server 602. Examples of a cloud gateway server include a server on Amazon's EC2, Google App Engine or Microsoft Azure. The cloud gateway server 602 may convert the message into a format that can be "pushed" down to user communication devices. A cloud push notify server 604 may then push the message to devices such as wireless device 122, fire control panel 102, computer 124, and notification device 510. The cloud gateway server may provide the functions of the internet notification server. In some implementations the cloud gateway server may be a sub-type of internet notification server 126.

The devices that receive the "pushed" message may receive the message at an application that is running as a back ground application. Upon receipt of the "pushed" message, the application may respond to the cloud gateway server when the message is accessed or read. The message may also consist of a URL of the audio message which may be automatically played on the wireless devices once received.

Figure 7:
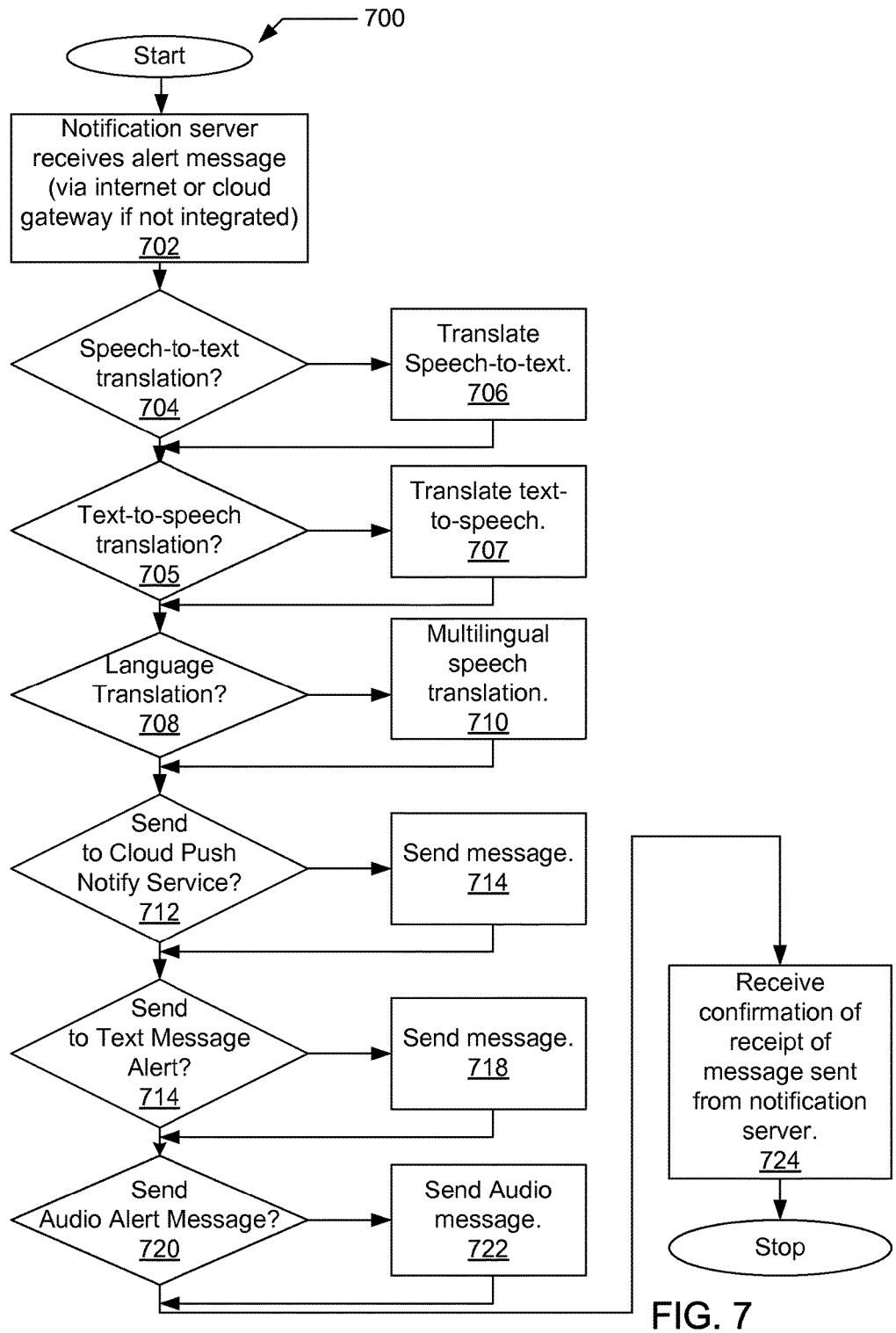
FIG. 7 is a flow diagram of an approach for notification of devices from fire and voice control panel is depicted in accordance with and example implementation of the invention.

In FIG. 7, a flow diagram 700 of an approach for notification of devices (i.e. 122, 102, 124, and 510) from fire and voice control panel 106 is depicted in accordance with and example implementation of the invention. The notification server, such as internet notification server 126, receives a message (i.e. alert message) in step 702. The message may originate from a fire and voice control panel 106 or the internet. A cloud gateway 314 may also assist in the transmission of the message from fire and voice control panel 106 and/or internet. In other implementations, other types of panels may generate the message. If the message received at the internet notification server is an audio based message, then the audio message in step 704 may be converted to a text based message by the text-to-speech translation module 304 in step 706. If the message received at the internet notification server is a text based message, then the text message in step 705 may be converted to an audio (i.e. speech) message in step 707. If the message needs to be converted into a different language in step 708, then the message may be translated into another language by the multilingual speech translation in step 710.

If the text alert message needs to be sent to a cloud push notify server 604 in step 712, then the message may be sent from the internet notification server 126 to the cloud push notify server 604 in step 714. The message may be sent via the internet or other network connections. If the text based message need to be sent as a text alert message 508 in step 714, then may be sent to a wireless station server 120 or directly to other networked devices (i.e. 102, 124, and 510) in step 718. If an audio message 310 and/or 312 needs to be sent in step 720, then the audio message may be sent by the internet notification server 126 to wireless station server 120, fire control panel 102, and/or computer 124 in step 722. The notification server in step 724 may receive confirmation that the sent message in step 714, 718, and/or 722 was received.

Figure 8:
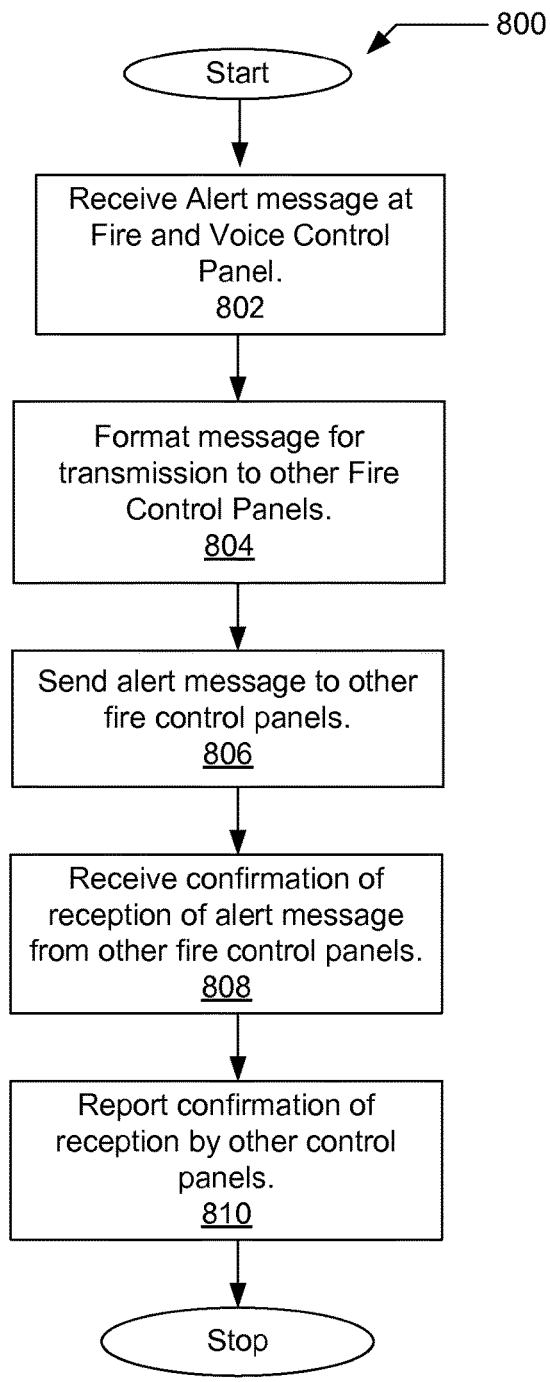
FIG. 8 is a flow diagram of an approach for alert messages being passed between fire panels is depicted in accordance with an example implementation of the invention.

Turning to FIG. 8, a flow diagram 800 of an approach for alert messages being passed between fire panels, such as panels 102 and 106 in accordance with an example implementation of the invention is depicted. An alert message may be received at fire and voice control panel 106 in step 802 via a wireless modem 136. The message may then be formatted for transmission to other fire control panels in step 804. The formatting may include security being added to the message for verification at the receiving panel. The formatted alert message may then be sent as text or encoded digitized audio to other control panels in step 806. A confirmation may be received at the sending fire control panel, such as fire and voice control panel 106, from the fire control panel that received the alert message in step 808. A confirmation of receipt message may be generated and sent by the fire and voice control panel 106 to the originator of the initial alert message in step 810.

It will be understood, and is appreciated by persons skilled in the art, that one or more processes, sub-processes, or process steps described in connection with FIGS. 7-8 may be performed by hardware and/or software (machine readable instructions). If the approach is performed by software, the software may reside in software memory (not shown) in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for handling fire alarm and notification events has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

The invention claimed is:

1. A safety alarm system that signals an emergency condition, comprising:
an internet notification server with a network interface;
a wireless station server configured to enable communication with wireless communication devices;
a database associated with the wireless station server; and
an alert message in a first language received at the network interface via internet, where the alert message results in another message being formatted for transmission to wireless communication devices and provides notice of the emergency condition in a second language,
wherein a selection of the wireless communication devices by the wireless station server occurs independent of the type of data in the alert message and the format of the alert message, where the second language is associated with selected wireless communication devices, and
wherein the database is configured to identify the wireless communication devices to receive the alert message or other message and to identify a language of the alert message or other message.

2. The safety alarm system of claim 1,
where the alert message is a text message and results in an audio message as the other message that is generated by a text-to-speech translation module.

3. The safety alarm system of claim 2,
where the audio message is changed from the first language to the second language by the multilingual speech translation module.

4. The safety alarm system of claim 1,
where the alert message is a text message having the first language and results in an audio message as the other message with the audio message having the second language.

5. The safety alarm system of claim 1,
where the notification severs is a cloud gateway sever and the other message is sent for receipt by a cloud push notify service.

6. The safety alarm system of claim 1,
wherein the other message is a digital audio message formatted for transmission by an emergency notification module for receipt by the wireless communication devices.

7. The safety alarm system of claim 1,
where the alert message is a digital audio message that results in a text message as the other message by the speech-to-text translation module.

8. The safety alarm system of claim 7,
where the text message is translated from a first language to a second language by a multilingual translation module.

9. The safety alarm system of claim 1,
where the alert message is a digital audio message in a first language that results in a text message in a second language as the other message.

10. The safety alarm system of claim 1,
where the notification server is a fire control panel and the communication device is another fire control panel.

11. A method for signal of an emergency condition in a safety alarm system, comprising:
coupling internet notification server at a network interface with a network;
receiving an alert message at the network interface via internet in a first language;
formatting another message for transmission to at least one wireless communication device in response to receipt of the alert message, where the other message provides notice of the emergency condition; and
selecting the at least one wireless communication device independent of the type of data in the alert message and the format of the alert message, where the other message is in a second language associated with the at least one wireless communication device; and
transmitting the other message to the at least one wireless communication device by a wireless station server,
wherein a database is associated with the wireless station server, the database being configured to identify the wireless communication devices to receive the alert message or other message and to identify a language of the alert message or other message.

12. The method for signaling of an emergency condition in a safety alarm system of claim 11, further comprising:
generating an audio message with a text-to-speech translation module in response to receipt of the alert message where the alert message is a text message.

13. The method for signaling of an emergency condition in a safety alarm system of claim 12, including changing the audio message from the first language to the second language by a multilingual speech translation module.

14. The method for signaling of an emergency condition in a safety alarm system of claim 11, further comprising:
converting the alert message that is a text message having the first language and results in an audio message as the other message, where the audio message has the second language.

15. The method for signaling of an emergency condition in a safety alarm system of claim 11, further comprising:
sending the other message for receipt by a cloud push notify service from the notification severs that is a cloud gateway severs.

16. The method for signaling of an emergency condition in a safety alarm system of claim 11, further comprising:
formatting the other message that is a digital audio message for transmission by an emergency notification module located at the notification server for receipt by communication devices.

17. The method for signaling of an emergency condition in a safety alarm system of claim 11, further comprising:
converting the alert message that is a digital audio message into a text message as the other message with a speech-to-text translation module.

18. The method for signaling of an emergency condition in a safety alarm system of claim 17, further comprising:
translating the text message from the first language to the second language with a multilingual translation module.

19. The method for signaling of an emergency condition in a safety alarm system of claim 11, further comprising:
translating the alert message that is a digital audio message in the first language into a text message in the second language as the other message.

* * * * *